United States Patent [19]

Schoolcraft

[11] 4,430,399

[45] Feb. 7, 1984

[54] METHOD OF ELECTRODE FORMATION AND ARTICLE

[75] Inventor: Robert J. Schoolcraft, Croton, N.Y.

[73] Assignee: Duracell Inc., Bethel, Conn.

[21] Appl. No.: 344,345

[22] Filed: Feb. 1, 1982

Related U.S. Application Data

[62] Division of Ser. No. 190,549, Sep. 25, 1980.

[51] Int. Cl.$^3$ .............................................. H01M 4/02
[52] U.S. Cl. ................................... 429/218; 429/219; 252/182.1
[58] Field of Search .................. 429/218, 232, 219; 264/104, 105; 252/500, 512, 514, 506, 182.1

[56] References Cited

U.S. PATENT DOCUMENTS 2,772,321 11/1956 Ensign .................................. 429/218
3,630,779 12/1971 Eisenberg ........................... 264/104

*Primary Examiner*—Anthony Skapars
*Attorney, Agent, or Firm*—Ronald S. Cornell; Israel Nissenbaum

[57] ABSTRACT

An electrode for an electrochemical cell is formed by blending an electrochemically active compound with a conductive material, forming the blend into a plurality of agglomerates, admixing the agglomerates with a second conductive material which may be the same as or different from the first conductive material and compressing the resulting mixture. The method is particularly useful for forming cathodes containing a mercury compound, since such cathodes have greatly enhanced abilities to immobilize free mercury during cell discharge.

8 Claims, No Drawings

METHOD OF ELECTRODE FORMATION AND ARTICLE

This is a division, of application Ser. No. 190,549, filed 9/25/80.

BACKGROUND OF THE INVENTION

In electrochemical cells many of the compounds useful as the cathode active materials, are nonconducting. For improved discharge characteristics the nonconductive active materials are generally admixed with electrochemically inert conductive materials, and/or pressed onto an inert conductive grid, or a conductive metal layer is formed on the surface of the cathode. The added conductive material, grid or layer is unreactive with the active cathode material in order to prevent the self-discharge of the cathode. The increase in conductivity is, however, weighed against the decrease in energy density brought about by the addition of the inert materials to the cathode.

In many electrochemical cells the added conductive material, in addition to increasing electrode conductivity, performs other functions. For example, in cells containing a nonconductive mercury compound as one of the components of the cathode, silver (electrochemically inert to mercury compounds) has been added to both improve cathode conductivity and also to immobilize the free elemental mercury formed within the cell during cell discharge. The elemental mercury is a mobile conductive liquid in the cathode and can migrate from the cathode into other parts of the cell thereby possibly short circuiting the cell. The silver within the cathode however immobilizes the liquid mercury by amalgamating with it.

In many mercury cells the added material has not, however, been completely successful in immobilizing all of the mobile mercury produced. Simply adding more amalgamating materials is undesirable, since such added materials reduce cell capacity. In addition, silver, the most commonly used material has become more costly with increased amounts of added silver thereby prohibitively increasing the cost of finished cells.

THE INVENTION

It has now been discovered that useful electrodes for electrochemical cells can be made by blending an electrochemically active material, such as mercury compounds, with a first conductive material, agglomerating the blend into a plurality of agglomerates, and then admixing the agglomerates with a second conductive material, which may be the same as or different from the first conductive material. The mixture is then compressed into an electrode. The resulting electrode comprises a compressed mass of agglomerates with a matrix of the second conductive material interposed between the agglomerates. The first and second conductive materials can be the same or different materials.

The present invention has been found to have particular utility in the manufacture of electrodes containing a mercury compound and employing a mercury immobilizing conductive material. Discharged electrodes made in accordance with the present invention has been found to have no, or significantly less, free mercury than discharged conventional electrodes having similar quantities of conductive and electrode active material which were simply initially uniformly blended together and conventionally formed into the electrodes. Further, it has been found that the first conductive material, which is blended with the mercury compound and formed into agglomerates, does not necessarily have to be capable of immobilizing mercury. As a result, though the total amount of conductive material remains about the same, less of the expensive amalgamating material such as silver is required since only the second conductive material has amalgamating properties.

DESCRIPTION OF THE PREFERRED EMBODIMENTS

The preferred embodiments of the present invention relate to cathodes containing mercury compounds. The cathodes of the present invention are preferably formed by blending a mercury compound with a conductive material. The resultant blend is then agglomerated, by preferably first slugging or pressing the powder into a pellet and then forcing the pellet through a screen or wire mesh. The agglomerates employed in the cathode of the present invention can be of any desired size, with preferred agglomerates passing through a screen having openings one millimeter in width. The agglomerates, however formed, are admixed with a sufficient quantity of a second conductive material capable of amalgamating substantially all of the mercury formed by the electrode during cell discharge. The conductive material admixed with the agglomerates can be, but does not necessarily have to be, the same material initially blended with the mercury compound to form the agglomerates.

Mercury compounds useful in the cathode of the present invention include all of the mercury compounds previously used in the cathodes of electrochemical cells. Such compounds include mercuric oxide (HgO) (preferably the red form), mercuric chromate ($HgCrO_4$), mercuric chloride ($HgCl_2$), mercuric permanganate ($Hg(MnO_4)_2$), mercuric periodate ($Hg_5(IO_6)_2$), mercuric sulfate ($HgSO_4$), mercuric cyanide ($Hg(CN)_2$) and mercuric dioxysulfate ($HgSO_4 \cdot 2HgO$).

The conductive material which is initially blended with the mercury compound to form the agglomerates can be any conductive material that will not react with the mercury compound. Preferred conductive materials include carbonaceous materials, such as graphite, and metals such as silver. Other useful conductive materials include noble metals such as gold, platinum and iridium, either alone or as alloys and intermetallics. The quantity of conductive material which is blended with the mercury compound to form the agglomerates can vary from about 0.02 mole to about 1 mole of conductive material per mole of mercury compound, with the preferred ratio being from about 0.1 mole to about 0.5 mole of conductive material per mole of mercury compound.

The conductive material which is admixed with the agglomerates of blended conductive material and mercury compound can be any conductive material that will amalgamate with free mercury and will not adversely react with the mercury compound or any of the other components of the cell. The major criteria for the selection of a conductive material include the amalgamating ability of the material, its conductivity, and its inertness to the mercury compound, anode, electrolyte or other cell constituent when placed into an electrochemical cell. The presently preferred conductive amalgamating material is silver.

The ratio (expressed in moles) of the second conductive material admixed with the agglomerates can vary from about 0.1 mole to about 1 mole of conductive material per mole of mercury compound in the agglomerates. The preferred quantity of the second conductive material varies from about 0.2 mole to about 0.7 mole per mole of mercury compound present in the agglomerate. The total ratio of moles of conductive material in the powder, including that forming part of the agglomerates and that admixed with the agglomerates, should not exceed about two moles of conductive material per mole of mercury compound. Larger quantities of conductive material within the cathode will unnecessarily reduce cell capacity due to the volume of the non-cathode active conductive material without further benefit. The preferred ratio of first and second conductive material present within the powder is about three moles of the second conductive material (admixed with the agglomerates) per mole of first conductive material (within the agglomerates).

The mixture of agglomerates and conductive material can thereafter be conventionally formed into a cathode, for use in an electrochemical cell, such as by compressing a measured portion of the mixture into a pellet with or without added lubricants such as polytetrafluoroethylene. Other methods of forming cathodes are well known in the art, and will depend generally upon the desired cell configuration or utilization purposes.

Cathodes containing mercury compounds can be used in electrochemical cells having either aqueous or nonaqueous electrolytes and can be used with most anode materials. A conventional separator similar to that used with other electrochemical cells can also be incorporated into the cell employing the cathode of the present invention.

Nonaqueous electrolytes useful with the cathodes of the present invention include those generally used with active light metal anodes. Commonly used nonaqueous electrolytes include one or more conventional organic solvents having dissolved therein at least one solvent-soluble ionic salt of a light metal anode. Examples of organic solvents include, among others, tetrahydrofuran, N-nitrosodimethylamine, dimethyl sulfoxide, dimethyl sulfite, propylene carbonate, gamma-butyrolactone, dimethyl carbonate, dimethoxyethane, acetonitrile and dimethyl formanide. The conductive electrolyte solvent-soluble ionic salt can consist of the salt of the anode metal with such anions as $ClO_4^-$, $AsF_6^-$, $BF_4^-$, $SbF_6^-$, $AlCl_4^-$, $Cl^-$, $Br^-$, and $I^{31}$ anions. Anodes useful with the nonaqueous electrolyte can be selected from the active light metal anode metals, examples of which include lithium, sodium, potassium, calcium, beryllium, magnesium, and aluminum.

Aqueous electrolyte useful with the cathodes of the present invention can be either alkaline or acidic. The preferred electrolyte is alkaline, and comprises an aqueous solution of potassium or sodium hydroxide. Other aqueous electrolytes useful with mercury compounds containing cathodes are well known to those skilled in the art.

Anode electrodes suitable for use with mercury compound containing cathodes and aqueous electrolyte solutions include all metals having a lower electromotive potential than the mercury compound being used. Such anode materials include most metals, such as zinc, cadmium, aluminum, iron, lead, magnesium, and nickel.

The herein disclosed invention will be better understood from the following Examples. Unless otherwise indicated all parts are parts by weight.

EXAMPLE 1

A mixture for use in a cathode of an electrochemical cell is formed by uniformly blending 80 parts of red mercuric oxide (HgO) powder with 5 parts of silver powder. The resulting blend is agglomerated by compressing the mixture into a pellet and then forcing the pellet through an 18 mesh screen which has one millimeter wide openings. This process porduces agglomerates generally smaller than one millimeter. The agglomerates are then thoroughly admixed with 15 parts of silver and with 0.5 part of polytetrafluoroethylene. The resulting mixture is formed into a cathode by placing about 0.5 gram of the mixture into a press and compressing it into a pellet utilizing several kilograms per square centimeter of pressure. The polytetrafluoroethylene acts as a lubricant during the formation of the cathode.

The formed cathode is placed into a cell can along with a cellulose separator, about 0.06 gram of an electrolyte solution consisting of about 30 percent potassium hydroxide by weight and an anode pellet. The anode pellet comprising about 0.12 gram of amalgamated zinc of which 10 percent by weight is mercury. The cell is then conventionally closed using an insulative grommet and a top. After cell discharge substantially no free mercury is found in the cathode or other portions of the cell.

Some previously employed cathodes, even though containing similar percentages of materials, were not able to immobilize all free mercury produced during cell discharge, as the cathode formed by the present invention is able to do.

EXAMPLE 2

One hundred (100) parts of a mixture for use in a cathode of an electrochemical cell is formed by uniformly blending 84 parts of red mercuric oxide powder (HgO) with 0.5 part of carbon powder. The resulting blend is agglomerated by compressing the mixture into a pellet and then pressing the pellet through an 18 mesh screen. The agglomerates are then thoroughly mixed with 15 parts of silver and with 0.5 part of polytetrafluoroethylene. The resulting mixture is formed into a cathode and incorporated into an electrochemical cell as in Example 1.

After cell discharge no free mercury is found in the cathode or other portions of the cell. The cathode of Example 2 is as effective as that of Example 1 in immobilizing elemental mercury even though it contains twenty-five percent less silver and is therefore preferred. This embodiment of the present invention produces a savings in material costs by replacing expensive silver by cheaper carbon without a loss of effectiveness.

EXAMPLES 3-9

Mixtures for use in a cathode of an electrochemical cell are formed as in Example 2 except that the mercuric oxide is replaced by mercuric chromate ($HgCrO_4$), mercuric chloride ($HgCl_2$), mercuric permanganate ($Hg(MnO_4)_2$), mercuric periodate ($Hg_5(IO_6)_2$), mercuric sulfate ($HgSO_4$), mercuric cyanide ($Hg(CN)_2$) and mercuric dioxysulfate ($HgSO_4 \cdot OHgO$) respectively. The mixture is formed into a cathode and incorporated into an electrochemical cell as in Example 2. On discharge substantially no free mercury is found in the cells.

Although the preferred embodiments of the present invention and examples are described in terms of cathodes containing a mercury compound, other electrodes formed by the herein described method and containing other nonconducting active materials are also within the scope of the present invention. It is also understood that changes and variations in the above disclosure and examples can be made without departing from the spirit and scope of the present invention as defined in the following claims.

What is claimed is:

1. An electrode for an electrochemical cell comprising a compressed mass of a plurality of agglomerates of an electrochemically active compound, a first conductive material substantially uniformly distributed throughout each agglomerate, and a matrix of a second conductive material interposed between the agglomerates.

2. The electrode of claim 1 wherein the first and second conductive materials are the same.

3. The electrode of claim 1 wherein the electrochemically active compound comprises a mercury compound, and wherein the second conductive material is capable of and present in sufficient quantity to amalgamate with substantially all of the mercury producible by the electrode during electrode discharge.

4. The electrode of claim 1 wherein the first conductive material is selected from the group consisting of silver and carbonaceous materials.

5. The electrode of claim 1 wherein the second conductive material is silver.

6. The electrode of claim 3 wherein the mercury compound comprises red mercuric oxide.

7. The electrode of claim 3 wherein the first and second conductive materials are silver.

8. An electrochemical cell comprising an anode, an electrolyte and the electrode of claim 1, all operatively associated.

* * * * *